United States Patent
Wang et al.

(10) Patent No.: US 10,268,060 B2
(45) Date of Patent: Apr. 23, 2019

(54) FRAMELESS DISPLAY DEVICE AND ELECTRONIC DEVICE USING THE SAME

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Na Wang, Guangdong (CN); Cheng-Fa Chung, New Taipei (TW); Ren-Xin Guo, Shenzhen (CN); Lei Liang, Guangdong (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/631,051

(22) Filed: Jun. 23, 2017

(65) Prior Publication Data

US 2018/0136497 A1    May 17, 2018

(30) Foreign Application Priority Data

Nov. 14, 2016    (CN) .......................... 2016 1 1002095

(51) Int. Cl.
*G02F 1/1333*    (2006.01)
*G06F 1/16*    (2006.01)

(52) U.S. Cl.
CPC ...... *G02F 1/133308* (2013.01); *G02F 1/1333* (2013.01); *G06F 1/1601* (2013.01); *G02F 2001/133314* (2013.01); *G02F 2001/133317* (2013.01)

(58) Field of Classification Search
CPC ....... G02F 1/1333; G02F 2001/133317; G02F 1/133308; G02F 1/133608; G02F 2001/133311; G02F 2001/133314; G02F 2001/13332; G02F 2001/133322; G02F 2001/133325; G02F 2001/133328; G02F 2001/133331; G02F 2001/133334; G06F 1/1601
USPC ..................................................... 349/58–60
See application file for complete search history.

(56) References Cited

U.S. PATENT DOCUMENTS

| | | | | |
|---|---|---|---|---|
| 2006/0114694 A1* | 6/2006 | Cho | ..................... | G02B 6/0083 362/631 |
| 2012/0062815 A1* | 3/2012 | Kim | .................. | G02F 1/133308 349/61 |
| 2012/0182700 A1* | 7/2012 | Byeon | ............... | G02F 1/133308 361/749 |
| 2012/0281383 A1* | 11/2012 | Hwang | ............. | G02F 1/133308 361/807 |

(Continued)

*Primary Examiner* — Shan Liu
(74) *Attorney, Agent, or Firm* — ScienBiziP, P.C.

(57) ABSTRACT

An adhesive-free frameless display device comprises a backplane, an optical element secured to a surface of the backplane, a display panel secured to a side of the optical element away from the backplane, and a fixing assembly. The fixing assembly comprises a middle frame, a combining member removably secured to the middle frame, and a fixing member removably secured to the middle frame. The fixing member fixes the backplane, the display panel, and the combining member together. An electronic device using the frameless display device is also provided.

16 Claims, 3 Drawing Sheets

(56) References Cited

U.S. PATENT DOCUMENTS

| | | | | |
|---|---|---|---|---|
| 2012/0287645 A1* | 11/2012 | Ju | .................... | G02F 1/133512 |
| | | | | 362/296.01 |
| 2013/0169575 A1* | 7/2013 | Masuda | .................. | G06F 3/041 |
| | | | | 345/173 |
| 2014/0184926 A1* | 7/2014 | Shimomichi | .......... | H04N 5/645 |
| | | | | 348/794 |
| 2014/0320778 A1* | 10/2014 | Tang | ................. | G02F 1/133308 |
| | | | | 349/58 |
| 2016/0026030 A1* | 1/2016 | Kang | ............... | G02F 1/133308 |
| | | | | 349/58 |
| 2016/0131831 A1* | 5/2016 | Tomomasa | ........... | G02B 6/0031 |
| | | | | 348/790 |

* cited by examiner

FRAMELESS DISPLAY DEVICE AND ELECTRONIC DEVICE USING THE SAME

FIELD

The subject matter herein generally relates to a display device, and more particularly, to a frameless display device and an electronic device using the frameless display device.

BACKGROUND

A display device generally includes a front frame, a middle frame, a back frame, and a display panel. The front frame is used to fix the display panel on the middle frame. The front frame increases a thickness of the display device, and also makes the appearance of the display device look unappealing. A frameless display device generally comprises a middle frame, a back frame, and a display panel. The display panel of the frameless display device is attached on the middle frame by adhesive. The frameless display device does not include a front frame, but as the display panel is attached on the middle frame by adhesive, the frameless display device cannot be dismantled when the frameless display device is broken and needs to be reassembled.

BRIEF DESCRIPTION OF THE DRAWINGS

Implementations of the present technology will now be described, by way of example only, with reference to the attached figures.

DETAILED DESCRIPTION

Figure 1:
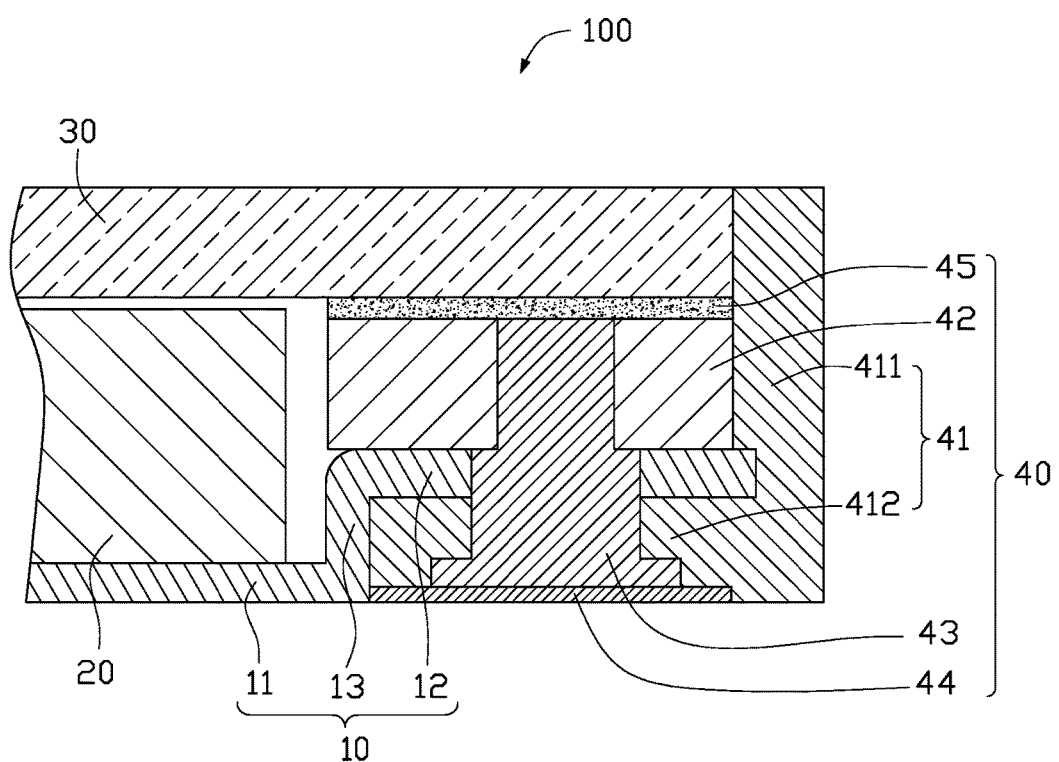
FIG. 1 is a diagrammatic view of a frameless display device according to an exemplary embodiment of the present application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better.

Several definitions that apply throughout this disclosure will now be presented.

The term "comprising" when utilized, means "including, but not necessarily limited to"; it specifically indicates open-ended inclusion or membership in the so-described combination, group, series, and the like.

Figure 2:
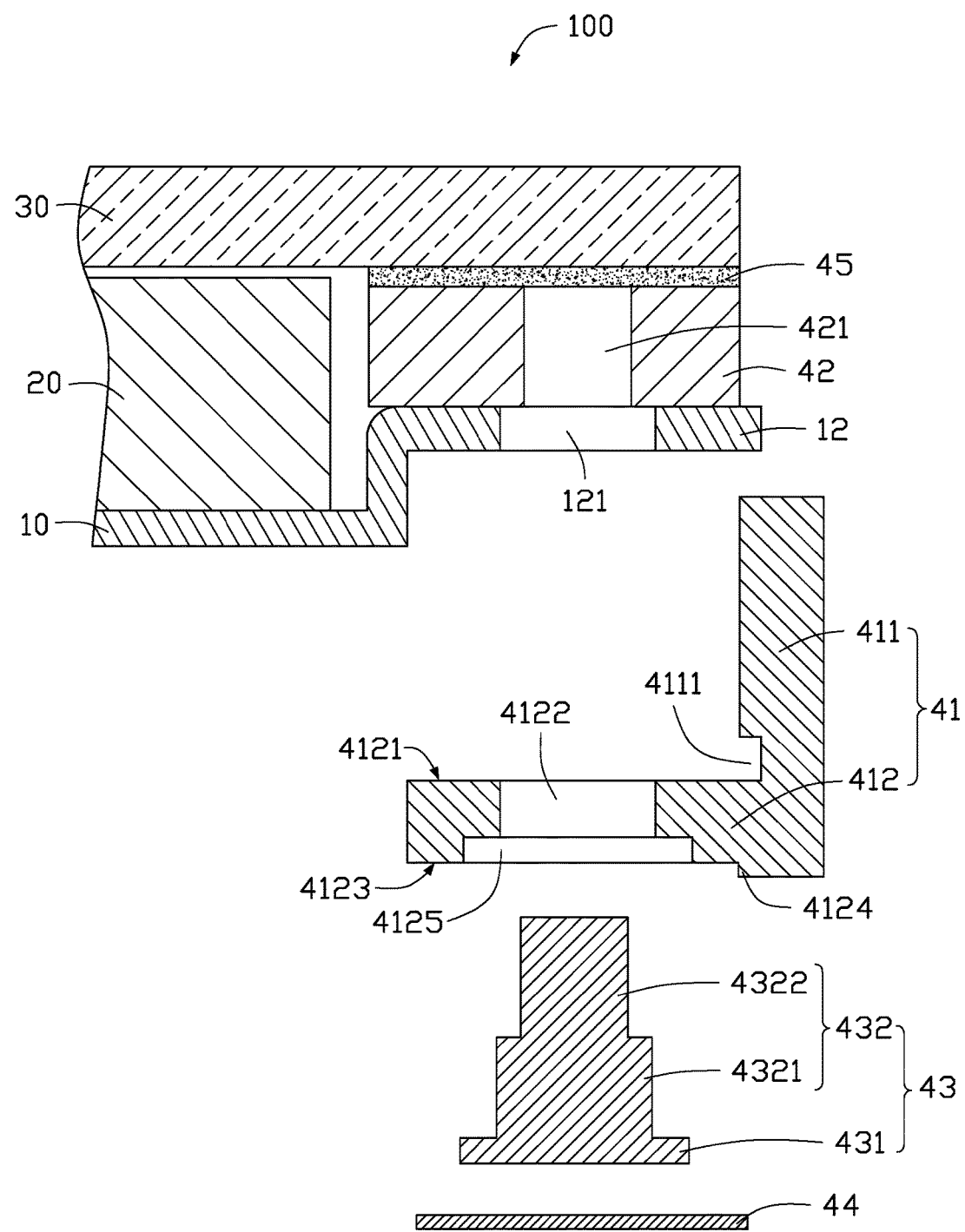
FIG. 2 is an exploded perspective view of the frameless display device of FIG. 1.

FIGS. 1-2 illustrate an exemplary embodiment of a frameless display device 100 including a backplane 10, an optical element 20 secured to a surface of the backplane 10, a display panel 30 secured to a side of the optical element 20 away from the backplane 10, and a fixing assembly 40 configured to join the display panel 30 to the backplane 10.

The backplane 10 has a roughly "S" shaped cross-section. The backplane 10 includes a first combining portion 11, a second combining portion 12, and a connecting portion 13 configured to connect the first combining portion 11 and the second combining portion 12. An end of the connecting portion 13 is connected with an end of the first combining portion 11, the other end of the connecting portion 13 is connected with an end of the second combining portion 12. An angle between the first combining portion 11 and the connecting portion 13 is greater than 0 degree and less than 180 degrees. An angle between the second combining portion 12 and the connecting portion 13 is greater than 0 degree and less than 180 degrees. In at least one exemplary embodiment, the angle between the first combining portion 11 and the connecting portion 13 is 90 degrees, the angle between the second combining portion 12 and the connecting portion 13 is 90 degrees, and the first combining portion 11 is parallel with the second combining portion 12.

The optical element 20 is secured on a surface of the first combining portion 11. The optical element 20 and the connecting portion 13 are at a same side of the first combining portion 11.

The fixing assembly 40 includes a middle frame 41, a combining member 42 removably secured to the middle frame 41, and a fixing member 43 removably secured to the middle frame 41. The combining member 42 is fixed on a surface of the display panel 30, and the combining member 42 is secured between the second combining portion 12 and the display panel 30. The fixing member 43 is configured to fix the middle frame 41, the second combining portion 12, and the combining member 42 together.

The middle frame 41 has a roughly L shaped cross-section. The middle frame 41 includes a side plate 411 and a fixing plate 412 perpendicularly connected with the side plate 411.

The fixing plate 412 includes a first surface 4121. The side plate 411 is secured on the first surface 4121. The second combining portion 12 is secured on the first surface 4121, and located between the fixing plate 412 and the combining member 42.

The side plate 411 defines a latching groove 4111. The latching groove 4111 is contiguous with the first surface 4121. An end of the second combining portion 12 away from the connecting portion 13 inserts into the latching groove 4111.

In at least one exemplary embodiment, an end portion of the side plate 411 away from the fixing plate 412 is coplanar with a surface of the display panel 30 away from the display panel 30.

The fixing member 43 includes a head portion 431 and a fixing post 432 straightly extending from the head portion 431. An external diameter of the head portion 431 is greater than a diameter of the fixing post 432. The fixing plate 412 defines a first fixing hole 4122, the second combining portion 12 defines a second fixing hole 121, and the combining member 42 defines a third fixing hole 421. The fixing post 432 is sequentially inserted into the first fixing hole 4122, the second fixing hole 121, and the third fixing hole 421. The head portion 431 is secured on the fixing plate 412, thereby the fixing member 43 fixes the fixing plate 412, the second combining portion 12, and the combining member 42 together. As the combining member 42 is fixed on the display panel 30, the middle frame 41, the backplane 10, and the display panel 30 are fixed together.

The first fixing hole 4122 and the second fixing hole 121 are through holes. The third fixing hole 421 may be a through hole or a blind hole.

The fixing post 432 may be a non-stepped column or a stepped column. The stepped column may be a one-stepped column or a two-stepped column.

When the fixing post 432 is a non-stepped column, a diameter of the first fixing hole 4122, a diameter of the second fixing hole 121, and a diameter of the third fixing hole 421 are equal, and are slightly greater than or equal to the diameter of the fixing post 432.

When the fixing post 432 is a one-stepped column, the fixing post 432 includes a first post 4321 connected with the head portion 431, and a second post 4322 connected with the first post 4321 and away from the head portion 431. A diameter of the first post 4321 is greater than a diameter of the second post 4322. In at least one exemplary embodiment, the diameter of the first fixing hole 4122 and the diameter of the second fixing hole 121 are equal, and are slightly greater than or equal to the diameter of the first post 4321. The diameter of the third fixing hole 421 is slightly greater than or equal to the diameter of the second post 4322. The first post 4321 is sequentially inserted into the first fixing hole 4122 and the second fixing hole 121, and the second post 4322 is inserted into the third fixing hole 421. In another exemplary embodiment, the diameter of the first fixing hole 4122 is slightly greater than or equal to the diameter of the first post 4321. The diameter of the second fixing hole 121 and the diameter of the third fixing hole 421 are equal, and are slightly greater than or equal to the diameter of the second post 4322. The first post 4321 is inserted into the first fixing hole 4122, and the second post 4322 is sequentially inserted into the second fixing hole 121 and the third fixing hole 421.

When the fixing post 432 is a two-stepped column, the fixing post 432 includes a first post 4321 connected with the head portion 431, a second post 4322 connected with the first post 4321 and away from the head portion 431, and a third post (not shown) connected with the second post 4322 and away from the first post 4321. A diameter of the first post 4321 is greater than that of the second post 4322, and a diameter of the second post 4322 is greater than that of the third post. The diameter of the first fixing hole 4122 is slightly greater than or equal to the first post 4321, the diameter of the second fixing hole 121 is slightly greater than or equal to the second post 4322, and the diameter of the third fixing hole 421 is slightly greater than or equal to the third post. The first post 4321 is inserted into the first fixing hole 4122, the second post 4322 is inserted into the second fixing hole 121, and the third post is inserted into the third fixing hole 421.

In at least one exemplary embodiment, the fixing post 432 is provided with an outer screw thread, and the first fixing hole 4122, the second fixing hole 121, and the third fixing hole 421 are provided with inner screw threads matching with the outer screw thread. The fixing post 432 is threadedly engaged with the first fixing hole 4122, the second fixing hole 121, and the third fixing hole 421.

The middle frame 41 includes a second surface 4123 opposite to the first surface 4121. In at least one exemplary embodiment, the second surface 4123 is provided with a block 4124. The block 4124 is located at an area of the second surface 4123 opposite to the side plate 411. The second surface 4123 further defines a receiving groove 4125, the first fixing hole 4122 is defined at the bottom of the receiving groove 4125. A diameter of the receiving groove 4125 is slightly greater than or equal to the diameter of the head portion 431, and a depth of the receiving groove 4125 is slightly greater than or equal to a thickness of the head portion 431. The head portion 431 is received in the receiving groove 4125, and a surface of the head portion 431 away from the fixing portion 431 is coplanar with the second surface 4123.

The fixing assembly 40 further includes a resin layer 44. The resin layer 44 is attached on the second surface 4123 and a surface of the head portion 431 away from the fixing portion 431, to fix the head portion 431 in the receiving groove 4125, thereby the fixing member 43 and middle frame 41 are firmly fixed together.

In at least one exemplary embodiment, a surface of the resin layer 44 away from the second surface 4123, a surface of the block 4124 away from the side plate 411, and a surface of the first combining portion 11 away from the optical element 20 are substantially coplanar with each other.

The fixing assembly 40 further includes an adhesive layer 45. The display panel 30 and the combining member 42 are attached to two opposite surfaces of the adhesive layer 45. The adhesive layer 45 is configured to join the combining member 42 to the display panel 30.

Figure 3:
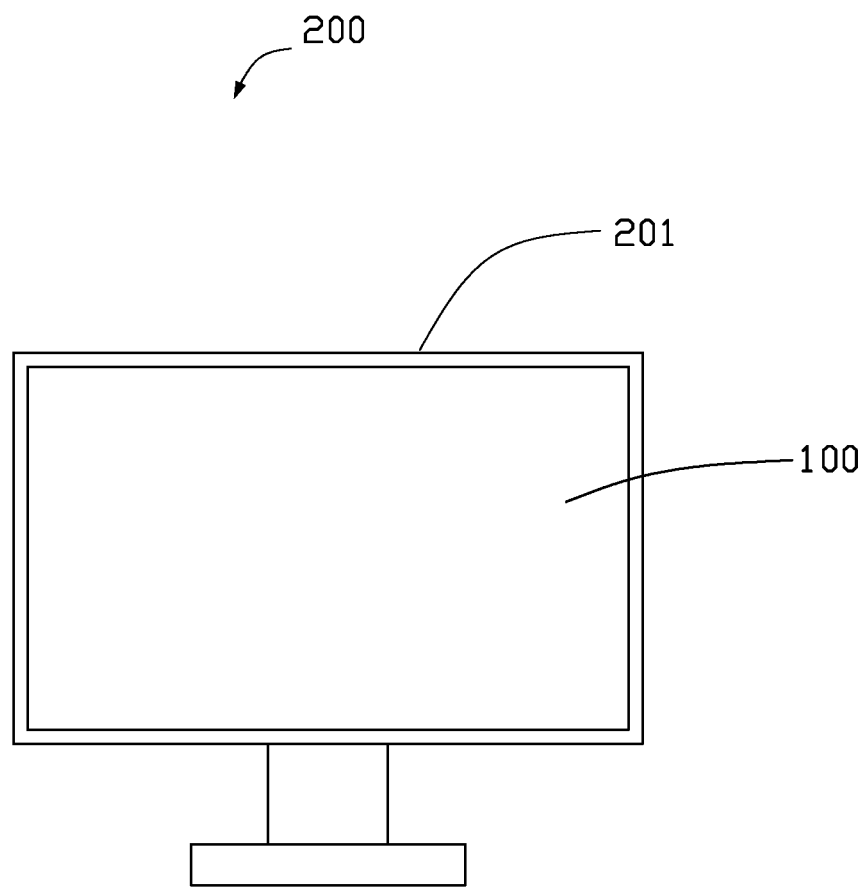
FIG. 3 a diagrammatic view of an electronic device using the frameless display device of FIG. 1.

FIG. 3 illustrates an electronic device 200 which includes a main body 201 and a frameless display device 100 mounted on the main body 201. The electronic device 200 may be, but is not limited to, a flat-panel television, a computer, an electronic reader, or a smart watch.

The embodiments shown and described above are only examples. Even though numerous characteristics and advantages of the present technology have been set forth in the foregoing description, together with details of the structures and function of the present disclosure, the disclosure is illustrative only, and changes can be made in the detail, including in matters of shape, size, and arrangement of the parts within the principles of the present disclosure, up to and including, the full extent established by the broad general meaning of the terms used in the claims.

What is claimed is:

1. A frameless display device comprising:
   a backplane comprising a first combining portion, and a second combining portion connecting with an end portion of the first combining portion;
   an optical element secured to a surface of the first combining portion;
   a display panel secured to a side of the optical element away from the first combining portion; and
   a fixing assembly comprising a middle frame, a combining member removably secured to the middle frame, and a fixing member removably secured to the middle frame, the middle frame comprises a side plate and a fixing plate perpendicular to the side plate, the display panel and the second combining portion are arranged at two opposite surfaces of the combining member, the second combining portion is secured between the combining member and the fixing plate;
   wherein the fixing plate comprises a first surface, the side plate is secured on the first surface, the side plate defines a latching groove directly on the first surface, and an end of the second combining portion away from the first combining portion is inserted into the latching groove; the fixing plate defines a first fixing hole, the second combining portion defines a second fixing hole, the combining member defines a third fixing hole, the fixing member sequentially inserts into the first fixing hole, the second fixing hole, and the third fixing hole, to fix the fixing plate, the second combining portion, and the combining member together.

2. The frameless display device of claim 1, wherein the backplane further comprises a connecting portion, an end of the connecting portion is connected with an end of the first combining portion, the other end of the connecting portion is connected with an end of the second combining portion, an angle between the first combining portion and the connecting portion is greater than 0 degree and less than 180 degrees, an angle between the second combining portion and the connecting portion is greater than 0 degree and less than 180 degrees.

3. The frameless display device of claim 1, wherein the fixing member comprises a head portion and a fixing post straightly extends from the head portion, the fixing plate comprises a second surface opposite to the first surface, the second surface further defines a receiving groove, the first fixing hole is defined at the bottom of the receiving groove, the head portion is received in the receiving groove, the fixing post sequentially inserts into the first fixing hole, the second fixing hole, and the third fixing hole.

4. The frameless display device of claim 3, wherein the fixing assembly further comprises a resin layer, the resin layer is attached on the second surface and a surface of the head portion away from the fixing portion.

5. The frameless display device of claim 4, wherein the second surface is provided with a block, the block is located at an area of the second surface opposite to the side plate, a surface of the resin layer away from the second surface, a surface of the block away from the side plate, and a surface of the first combining portion away from the optical element are substantially coplanar with each other.

6. The frameless display device of claim 3, wherein the fixing post comprises a first post connected with the head portion, and a second post connected with the first post and away from the head portion, a diameter of the first post is greater than a diameter of the second post, the first post sequentially inserts into the first fixing hole and the second fixing hole, the second post inserts into the third fixing hole.

7. The frameless display device of claim 3, wherein the fixing post comprises a first post connected with the head portion, and a second post connected with the first post and away from the head portion, a diameter of the first post is greater than a diameter of the second post, the first post inserts into the first fixing hole, the second post sequentially inserts into the second fixing hole and the third fixing hole.

8. The frameless display device of claim 1, wherein the fixing assembly further comprises an adhesive layer, the display panel and the combining member are attached to two opposite surfaces of the adhesive layer.

9. An electronic device comprising:
a main body; and
a frameless display device mounted on the main body, the frameless display device comprising:
a backplane comprising a first combining portion, and a second combining portion connecting with an end portion of the first combining portion;
an optical element secured to a surface of the first combining portion;
a display panel secured to a side of the optical element away from the first combining portion; and
a fixing assembly comprising a middle frame, a combining member removably secured to the middle frame, and a fixing member removably secured to the middle frame, the middle frame comprises a side plate and a fixing plate perpendicular to the side plate, the display panel and the second combining portion are arranged at two opposite surfaces of the combining member, the second combining portion is secured between the combining member and the fixing plate;
wherein the fixing plate comprises a first surface, the side plate is secured on the first surface, the side plate defines a latching groove directly on the first surface, and an end of the second combining portion away from the first combining portion is inserted into the latching groove; the fixing plate defines a first fixing hole, the second combining portion defines a second fixing hole, the combining member defines a third fixing hole, the fixing member sequentially inserts into the first fixing hole, the second fixing hole, and the third fixing hole, to fix the fixing plate, the second combining portion, and the combining member together.

10. The electronic device of claim 9, wherein the backplane further comprises a connecting portion, an end of the connecting portion is connected with an end of the first combining portion, the other end of the connecting portion is connected with an end of the second combining portion, an angle between the first combining portion and the connecting portion is greater than 0 degree and less than 180 degrees, an angle between the second combining portion and the connecting portion is greater than 0 degree and less than 180 degrees.

11. The electronic device of claim 9, wherein the fixing member comprises a head portion and a fixing post straightly extends from the head portion, the fixing plate comprises a second surface opposite to the first surface, the second surface further defines a receiving groove, the first fixing hole is defined at the bottom of the receiving groove, the head portion is received in the receiving groove, the fixing post sequentially inserts into the first fixing hole, the second fixing hole, and the third fixing hole.

12. The electronic device of claim 11, wherein the fixing assembly further comprises a resin layer, the resin layer is attached on the second surface and a surface of the head portion away from the fixing portion.

13. The electronic device of claim 12, wherein the second surface is provided with a block, the block is located at an area of the second surface opposite to the side plate, a surface of the resin layer away from the second surface, a surface of the block away from the side plate, and a surface of the first combining portion away from the optical element are substantially coplanar with each other.

14. The electronic device of claim 11, wherein the fixing post comprises a first post connected with the head portion, and a second post connected with the first post and away from the head portion, a diameter of the first post is greater than a diameter of the second post, the first post sequentially inserts into the first fixing hole and the second fixing hole, the second post inserts into the third fixing hole.

15. The electronic device of claim 11, wherein the fixing post comprises a first post connected with the head portion, and a second post connected with the first post and away from the head portion, a diameter of the first post is greater than a diameter of the second post, the first post inserts into the first fixing hole, the second post sequentially inserts into the second fixing hole and the third fixing hole.

16. The electronic device of claim 9, wherein the fixing assembly further comprises an adhesive layer, the display panel and the combining member are attached to two opposite surfaces of the adhesive layer.

* * * * *